United States Patent [19]

Kitamura

[11] Patent Number: 4,567,659
[45] Date of Patent: Feb. 4, 1986

[54] TOOL SIZE MEASURING APPARATUS FOR NC MACHINE TOOLS
[75] Inventor: Koichiro Kitamura, Takaoka, Japan
[73] Assignee: Kitamura Machinery Co., Ltd., Takaoka, Japan
[21] Appl. No.: 727,100
[22] Filed: Apr. 25, 1985
[51] Int. Cl.4 ............................................. G01B 7/28
[52] U.S. Cl. ......................................... 33/1 M; 33/201;
33/185 R; 33/503; 29/568
[58] Field of Search ................ 33/201, 1 M, 503, 545,
33/546, 569, 573, 568, 551, 553, 557, 560, 180
R, 181 R, 185 R; 29/26, 568; 408/1.3, 22

[56]  References Cited
U.S. PATENT DOCUMENTS

| | | | |
|---|---|---|---|
| 3,028,770 | 4/1962 | Pittwood | 29/26 R |
| 3,064,502 | 11/1962 | Pittwood | 29/568 |
| 3,074,147 | 1/1963 | Miller et al. | 29/26 |
| 3,380,326 | 4/1968 | Wappy | 33/185 R |
| 3,449,823 | 6/1969 | Jerue | 29/568 |
| 3,452,427 | 7/1969 | Lehmkuhl et al. | 29/568 |
| 3,546,774 | 12/1970 | Stoferle et al. | 29/568 |
| 3,709,623 | 1/1973 | Stephan et al. | 408/22 |
| 3,760,491 | 9/1973 | Zankl et al. | 29/568 |
| 3,822,466 | 7/1974 | Noguchi et al. | 29/568 |
| 3,911,540 | 10/1975 | Johnson et al. | 29/26 |
| 4,000,954 | 1/1977 | Patel | 408/3 |
| 4,012,830 | 3/1977 | Ewertowski | 29/568 |
| 4,088,417 | 5/1978 | Kosmowski | 408/1 |
| 4,166,323 | 9/1979 | Maag | 33/551 |
| 4,196,506 | 4/1980 | Reed | 29/568 |
| 4,237,595 | 12/1980 | Kitamura | 29/26 |
| 4,237,599 | 12/1980 | Buonauro et al. | 29/568 |
| 4,271,572 | 6/1981 | Lipp | 29/26 |
| 4,343,077 | 8/1982 | Satoh et al. | 29/568 |
| 4,358,888 | 11/1982 | Zankl et al. | 29/568 |
| 4,485,595 | 12/1984 | Minamiyama et al. | 29/568 |
| 4,497,410 | 2/1985 | Coate | 29/568 |
| 4,516,311 | 5/1985 | Takakuwa et al. | 29/568 |

FOREIGN PATENT DOCUMENTS 2844088  5/1980  Fed. Rep. of Germany .

Primary Examiner—Willis Little
Attorney, Agent, or Firm—Fleit, Jacobson, Cohn & Price

[57]  ABSTRACT

Each of the tools accommodated in a tool magazine of a NC machine tool is transferred to a reference receptacle arranged near to the tool magazine and the length and outer diameter of the tool are measured thereby inputting the measured values into the machining program.

3 Claims, 2 Drawing Figures

4,567,659

TOOL SIZE MEASURING APPARATUS FOR NC MACHINE TOOLS

BACKGROUND OF THE INVENTION

The present invention relates to a tool size measuring apparatus for NC machine tools, which automatically measures the dimensions, i.e., outer diameter and length of each of a large number of tools accommodated in a tool magazine of an NC machine tool and inputs or writes the actual measurements into the machining program.

Generally, methods which have heretofore been used for measuring the dimensions, i.e., outer diameter and length of the tools in NC machine tools include one in which prior to the accommodation of the tools in the tool magazine each of the tools is measured by a separate tool presetter and the measurements are inputted into the program and another in which after a tool has been fitted into the spindle the length of the tool is measured and its value is compensated thereby inputting the same into the program. However, the conventional measuring apparatus of these types have the disadvantages of requiring the stoppage of the operation of the machine tool for tool size measuring purposes and so on.

SUMMARY OF THE INVENTION

It is the primary object of the present invention to provide an apparatus capable of automatically measuring the length and outer diameter of each of a large member of tools accommodated in a tool magazine of an NC machine tool.

It is another object of the invention to provide a measuring apparatus which is simple in construction, efficient in operation and arranged adjacent to the tool magazine whereby the measurement of the dimension of a new tool is completed by the time that the new tool is moved to the position for replacing the used tool by a tool changing apparatus for machining purposes.

The above and other objects of the invention will become more apparent from the detailed description of its preferred embodiment taken in conjunction with the accompanying drawings.

In accordance with the invention there is thus provided a tool size measuring apparatus comprising a tool magazine for accommodating a large number of tools, tool demounting and mounting means for demounting and mounting a tool in a predetermined position within the tool magazine, a reference receptacle arranged at a position different from the tool receptacles of the tool magazine for temporarily receiving the tool gripped by the tool demounting and mounting means, and measuring means having a measuring element movable in the directions of two axes perpendicular to each other so as to measure the length and outer diameter of the tool received in the reference receptacle.

Thus, the apparatus of the invention is advantageous in that since the measurements can be inputted into the program not only in a case where all the tools in the tool magazine are moved round thereby automatically measuring the length and outer diameter of each of the tools prior to the start of machining operations but also in another case where the time during which the machining is effected by one tool is utilized to measure the length and outer diameter of another tool, it is possible to eliminate the hitherto inconvenience of stopping the operation of the NC machine tool or requiring additional labor for measuring the dimensions of the tools so that the measuring time is substantially reduced and the operating time of the machine tool is increased.

DESCRIPTION OF THE PREFERRED EMBODIMENT

Figure 1:
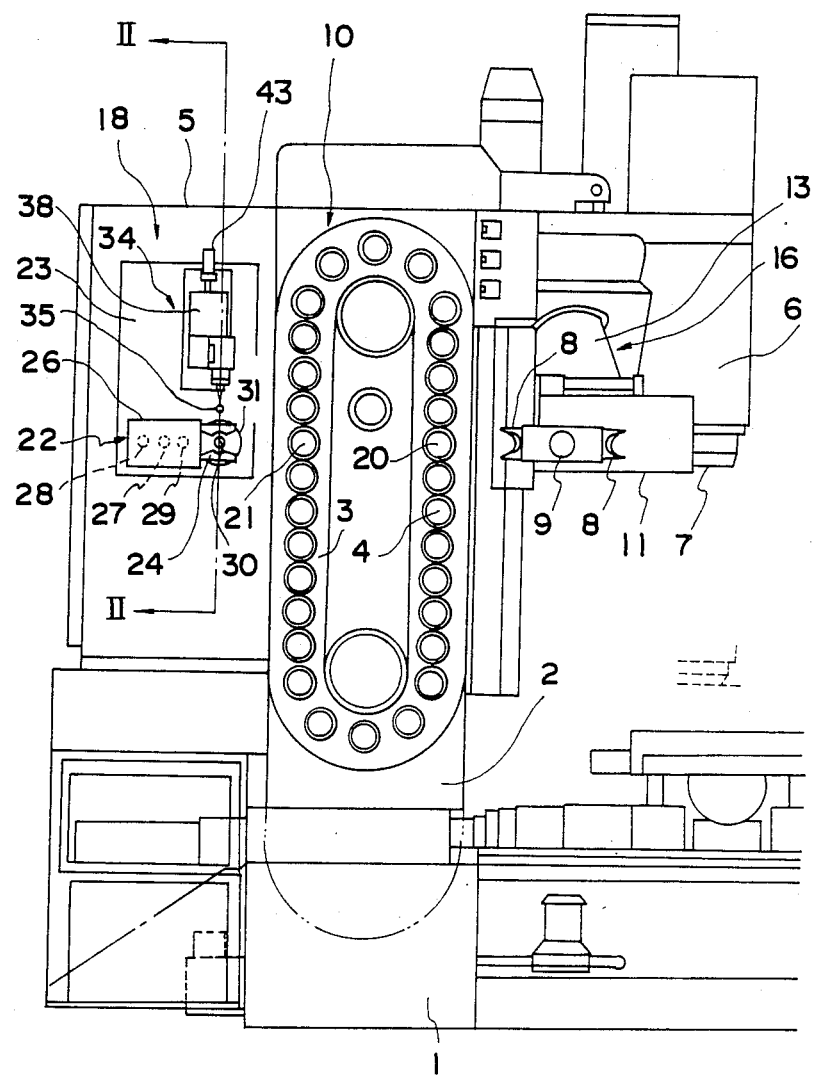
FIG. 1 is a side view of an NC machine tool incorporating an apparatus of this invention.
Figure 2:
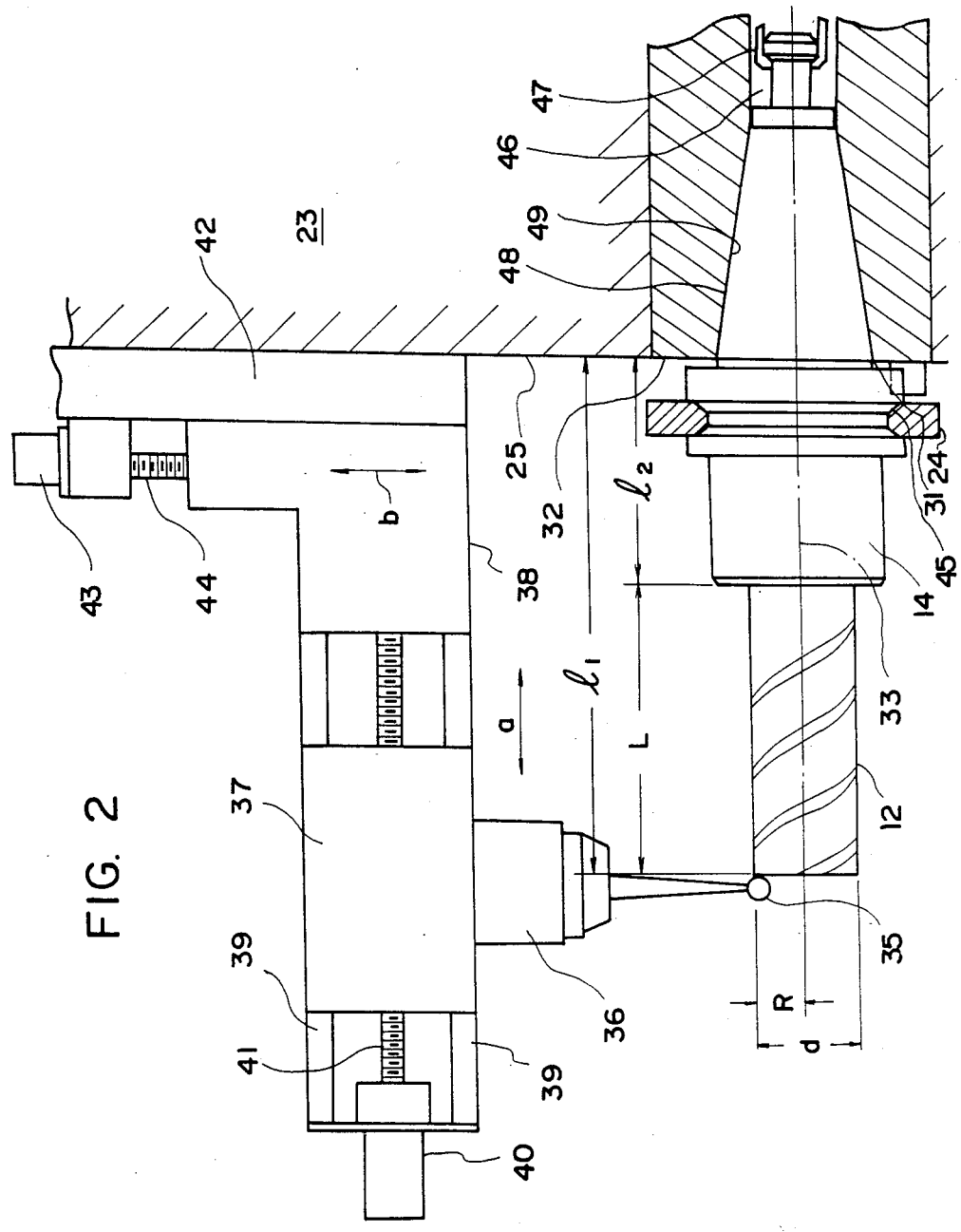
FIG. 2 is an enlarged sectional view taken along the line II—II of FIG. 1.

Referring to FIGS. 1 and 2, numeral 10 designates a tool magazine arranged on one side of a column 2 of an NC machine tool 1 so as to make a circular movement longitudinally. The tool magazine 10 includes a roller chain 3 extended over upper and lower sprockets (not shown) and the roller chain 3 is provided with a large number of pots 4 forming receptacles for tool holders 14. Various tools such as drills, reamers, milling cutters, etc., required for machining operations such as cutting and grinding are each concentrically fitted in one of the tool holders 14 and the tool holders 14 are received in the pots 4.

Numeral 16 designates an automatic tool changing apparatus arranged between the tool magazine 10 and a spindle 7 mounted on a vertically movable head 6. This tool changing apparatus 16 has already been proposed in U.S. patent application No. 516,559 and only its essential parts will be described briefly as follows.

In other words, the apparatus includes a pair of gripping claws 8 at its ends so that each claw 8 is adapted to make a half turn about a rotating shaft 9 and is also movable forward and backward in the direction of extension thereof at the half-turned position. Each claw 8 is also adapted to move in and out in the axial direction of the rotary shaft 9. The claws 8 are supported in the just-mentioned manner on a body 11 which in turn is moved spirally by the rotation of a rotary shaft 13 disposed in a downwardly inclined manner. Thus, as shown in FIG. 1, one of the claws 8 is opposed perpendicularly to the axis of a tool 12 at a predetermined tool changing position 20 and this gripping claw 8 is opposed perpendicularly to the axis of the spindle 7 when it has been moved spirally thus making a half turn. The other claw 8 is operated in all the same manner and these operations, coupled with the previously mentioned forward and backward operations and the move-in and move-out operations, result in the automatic changing of the tools.

Numeral 18 designates a tool size measuring apparatus according to the invention which automatically measures the dimensions of the tool 12 at a position 21 remote from the tool changing position 20 in the tool magazine 10. It is to be noted that the position 21 needs only be one which does not impedes the operation of the automatic tool changing apparatus 16.

In other words, mounted on a base 23 is a tool demounting and mounting unit 22 having at its one end a gripping claw 24 which is opposed perpendicularly to the axis of the tool 12 at the position 21. The base 23 is fixedly mounted on a side wall 5 of the machine tool proper and its surface forms a length-direction measuring reference plane 25 for the tool 12 (see FIG. 2). A body 26 of the tool demounting and mounting unit 22 is attached to one end of a shaft 27 and guide rods 28 and 29 which are adapted to move in and out in a direction perpendicular to the paper plane of FIG. 1. Then, the claw 24 is provided on the body 26 so as to be movable toward and away from the position 21. Although not shown, means for moving the body 26 in and out and means for advancing and retreating the claw 24 may each be comprised of ordinary driving means such as a cylinder unit. The base 23 is also provided, at a retreated position 30 of the gripping claw 24 shown in FIG. 1, with a reference receptacle 31 for temporarily receiving the tool 12 removed, along with the tool holder 14, from the tool receptacle 4 at the position 21 of the tool magazine 10. The reference receptacle 31 is the same in construction with the tool receptacles 4 and its surface 32 is coincident with the measuring reference plane 25 of the base 23 (see FIG. 2).

Numeral 34 designates a measuring unit arranged at a position above the reference receptacle 31 of the base 23. The measuring unit 34 includes a measuring element 35 arranged perpendicular to the axis of the tool 12 received in the reference receptacle 31 and a head 36 having the measuring element 35 is supported so as to be movable in the directions of two axes perpendicular to each other, i.e., in this embodiment a vertical direction perpendicular to the axis of the tool 12 and a direction parallel to the tool axis. The reference receptacle 31 concentrically holds the tool 12 through the tool holder 14 and its center line 33 serves as a radial measuring reference line for the tool 12.

Referring now to FIG. 2, the measuring element 35 comprises a touch sensor and the head 36 having the measuring element 35 is suspended from a first slider 37 which is movable in a direction parallel to the axis of the tool 12 or the directions of an arrow a. The first slider 37 is arranged on an L-shaped second slider 38 which is movable in a direction perpendicular to the axis of the tool 12 or the directions of an arrow b on the base 23. The first slider 37 is slidingly guided over the long side of the L-shaped second slider 38 along its guides 39 and it is also engaged with a ball screw 41 which is driven by a first servomotor 40. The length of the tool 12 is measured by the movement of the first slider 37 in the directions of the arrow a. The second slider 38 is slidingly guided along a guide base 42 arranged on the base 23 and it is also engaged with a ball screw 44 which is driven by a second servomotor 43. The outer diameter of the tool 12 is measured by the movement of the second slider 38 in the directions of the arrow b.

The tool holders 14, common to all the tools 12, are each formed with an annular groove 45 at a given position on its outer surface as shown in FIG. 2 so that when the gripping claw 24 of the tool demounting and mounting unit 22 is advanced into engagement with the groove 45 and then the body 26 of the gripping claw 24 is projected in the axial direction of the tool 12, the tool 12 accommodated at the position 21 of the tool magazine 10 is removed together with its tool holder 14. Then, when the gripping claw 24 is retreated and the body 26 is retracted, the tool 12 is received in the reference receptacle 31 formed in the base 23. Thus, a holding claw 47 of the reference receptacle 31 is engaged with an annular groove 46 formed at the base end of the tool holder 14 and also tapered surfaces 48 and 49 of the tool holder 14 and the reference receptacle 31, respectively, are brought into close contact with each other thereby firmly holding the tool 12 along the same axis 33.

Then, in this condition the first and second sliders 37 and 38 are respectively moved and the measuring element 35 is brought into contact with the forward end of the tool 12 thereby measuring the length L of the tool 12. In other words, the distance $l_2$ from the measuring reference plane 25 of the base 23 to the forward end of the tool 12 is already known so that by measuring the distance $l_1$ between the measuring reference plane 25 and the contact position of the measuring element 35, it is possible to readily obtain the tool length L by calculation. Also, by bringing the measuring element 35 into contact with the forward end upper surface of the tool 12, it is possible to measure the radius R from the measuring reference line 33 and readily obtain the outer diameter d of the tool 12 from the radius R.

The measured values of the length L and the outer diameter d of the tool 12 are inputted into the program of the machine tool. After the completion of the inputting, the tool demounting and mounting unit 22 is again operated in a manner reverse to the above-mentioned operation so that the tool 12 is transferred and accommodated in the initial position 21 of the tool magazine 10. Thereafter, the roller chain 3 of the tool magazine 10 is moved by intermittent feed and the dimensions of the next tool are measured in the abovementioned manner. By successively repeating this process, it is possible to complete the desired size measurement and the inputting or writing of the resulting individual measurements for all the tools in the tool magazine 10 for every rotation of the roller chain 3. Thus, the machining may be started after the size measurement has been completed on all the tools by a single rotation of the roller chain 3 or alternatively during the machining by one or more tools whose dimensions are already known the size measurement of the other unmeasured tools may be effected.

It is to be noted that in accordance with the present invention the type of the tool magazine presents no problem and no difficulty will be caused by the use of tool magazines of the types including the roller chain type of the above-described embodiment, the drum type, etc.

What is claimed is:

1. A tool size measuring apparatus for NC machine tools comprising:
    a tool magazine having tool receptacles for accommodating a large number of tools;
    tool demounting and mounting means for demounting and mounting one of said tools at a predetermined position in said tool magazine;
    a reference receptacle arranged at a position different from the tool receptacle of said tool magazine for temporarily accommodating said one tool gripped by said tool demounting and mounting means; and
    measuring means having a measuring element movable in the directions of two axes perpendicular to each other so as to measure a length and outer diameter of said tool accommodated in said reference receptacle.

2. An apparatus according to claim 1, wherein said tool demounting and mounting means comprises a claw for holding a tool holder of said one tool, and a body adapted to move said claw straightly between one of said tool receptacles and said reference receptacle which are parallel to each other and in the direction of the axis thereof.

3. An apparatus according to claim 1, wherein said measuring means having said measuring element comprises a first slider for moving said measuring element in a direction parallel to the axis of said reference receptacle, and a second slider for moving said first slider in a direction perpendicular to the axis of said reference receptacle.

* * * * *